United States Patent

McArdle et al.

[15] 3,697,800

[45] Oct. 10, 1972

[54] HIGH VOLTAGE HOLD DOWN CIRCUIT

[72] Inventors: John Joseph McArdle, Indianapolis; Robert Louis Rauck, Greenfield, both of Ind.

[73] Assignee: RCA Corporation

[22] Filed: May 11, 1970

[21] Appl. No.: 36,046

[52] U.S. Cl...............................315/27 R, 315/27 TD

[51] Int. Cl.................................................H01j 29/70

[58] Field of Search..........................315/27 R, 27 TD

[56] References Cited

UNITED STATES PATENTS 3,502,941 3/1970 Buechel.................315/27 TD

*Primary Examiner*—Benjamin A. Borchelt

*Assistant Examiner*—S. C. Buczinski

*Attorney*—Eugene M. Whitacre

[57] ABSTRACT

In a horizontal deflection circuit utilizing a voltage multiplier to develop the kinescope ultor voltage, a switching diode is coupled from the S-shaping capacitor in series with the deflection winding to a control element of a horizontal deflection output device to prevent the ultor voltage from increasing to an excessive level in the event the damper diode becomes open circuited. During normal operation, the voltage on the capacitor will reverse bias the switching diode, if however, the damper diode circuit opens, the capacitor voltage will cause the switching diode to conduct to clamp the control element of the output device to the capacitor voltage which prevents the horizontal output stage from developing excessive ultor voltage.

3 Claims, 2 Drawing Figures

Figures 1, 2:
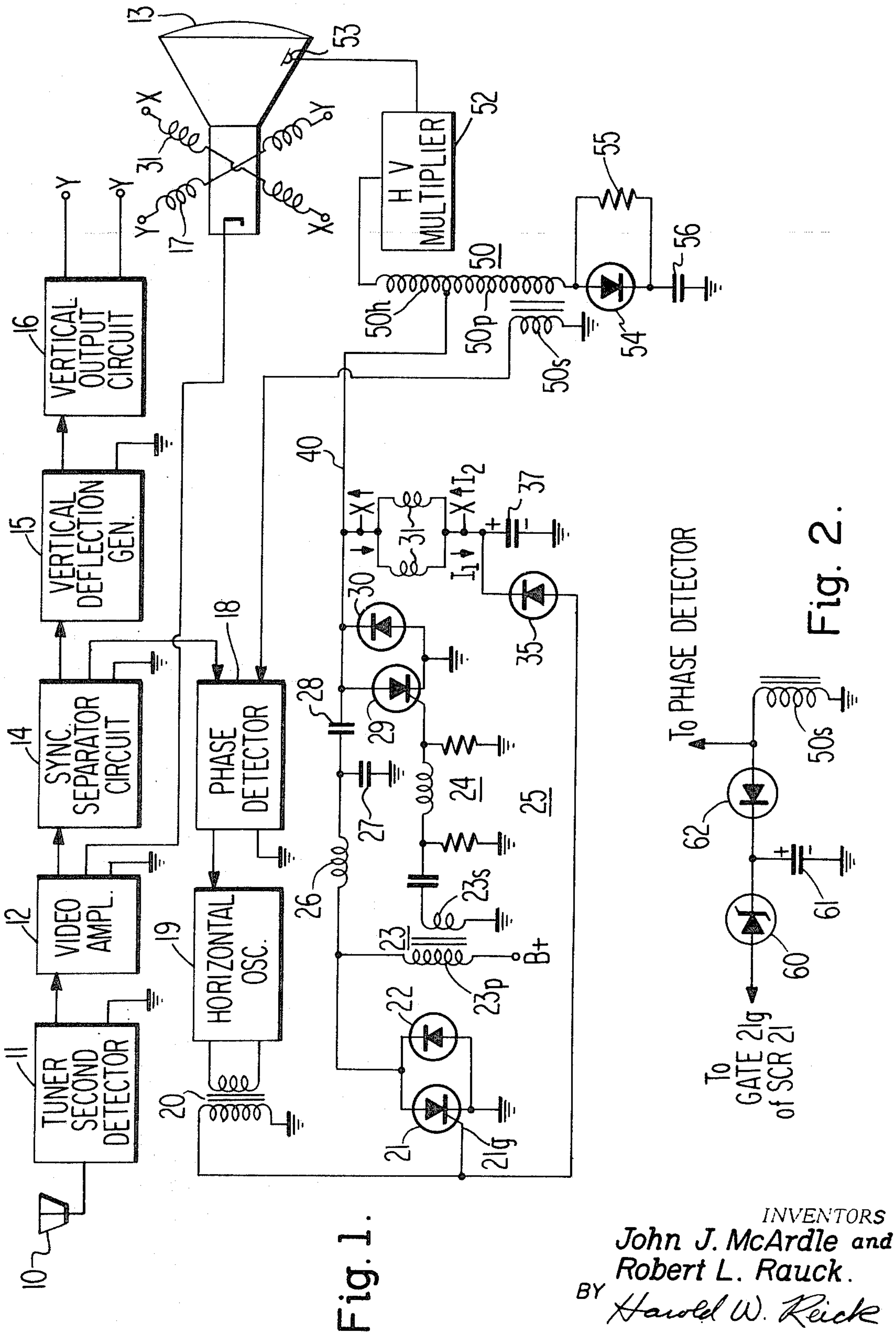

INVENTORS
John J. McArdle and
Robert L. Rauck.
BY Harold W. Reick
ATTORNEY

HIGH VOLTAGE HOLD DOWN CIRCUIT

This invention relates to electrical circuits and more particularly to deflection circuits of the type used to derive high voltage.

In many horizontal deflection circuits, a damper diode is coupled across the horizontal output transformer primary winding to damp out oscillations which would occur due to the ringing caused by the flyback pulse during the retrace portion of each deflection cycle. The damper diode is poled to conduct when the flyback voltage swings across the zero voltage level. In addition to providing a damping function, during a first part of trace this diode conducts to provide a current path for yoke current which is in a direction to place a charge on an S-shaping capacitor serially coupled to the yoke.

In some horizontal deflection output circuits, a high voltage multiplier is employed to develop the ultor voltage. Such a multiplier is described in detail in a copending application Ser. No. 830,026, entitled "ULTOR VOLTAGE SUPPLY", filed on June 3, 1969, now abandoned, and assigned to the present assignee. When a multiplier circuit of this type is utilized in conjunction with any horizontal output deflection stage, it rectifies the peak-to-peak voltage present at its input. If the damper diode is open circuited, and therefore allows the flyback voltage to swing negative as well as positive, the peak-to-peak voltage appearing at the input to the voltage multiplier may rise to an excessively high value (for example, 40,000 volts as compared to the normal 26,500 volts). If the ultor voltage reaches this level, the phosphor on the face of the kinescope will be destroyed due to the impacting high energy electrons. Also an X-radiation hazard may exist. Thus, it is important to hold the high voltage to a reasonable level if the damper diode fails.

The damper diode may become open circuited due to an electrical failure within the device. More commonly, however, when diodes are utilized which are mechanically clipped into the horizontal output stage, it is possible during servicing that the diode is either not replaced, or a faculty electrical connection is made at the mechanical terminals.

It is therefore an object of the present invention to prevent the ultor voltage from reaching an excessive level in a deflection output stage utilizing a high voltage multiplier when the damper diode current path is removed.

Deflection circuits embodying the present invention are of the type employing a multiplier circuit for developing a high voltage which is responsive to the peak-to-peak flyback voltage and includes a damper diode to provide a conduction path for deflection current during a portion of each deflection cycle and to limit the excursion of the flyback pulse to substantially a single polarity. Means are provided for developing a control voltage in response to positive and negative voltage excursions of the flyback pulse in the event the damper diode current path is removed. The control voltage is coupled to control element of a horizontal output semiconductor device to prevent the generation of an excessive high voltage.

The operation of the present invention can be best understood by referring to the figures and description thereof in which:

FIG. 1 is circuit diagram partly in schematic and block form of a television receiver embodying the present invention; and FIG. 2 illustrates an alternative embodiment of a circuit for preventing the development of excessively high voltages in a television receiver.

Referring to FIG. 1, the television receiver includes an antenna 10 which receives composite television signals and couples them to a tuner second detector stage 11. This stage normally includes a radio frequency amplifier for amplifying the received signals, a mixer-oscillator for converting the amplified radio frequency signals to intermediate frequency signals, an intermediate frequency amplifier and a detector for deriving composite television signals from the intermediate frequency signals. The output of stage 11 is coupled to a video amplifier 12 which amplifies the synchronization and brightness representative portions of the composite television signals and applies these signals to a control electrode (e.g., the cathode) of a television kinescope 13. The composite television signal from video amplifier 12 is also applied to a synchronizing signal circuit 14 which separates the synchronization signals from the video signals, and also separates the vertical from the horizontal synchronizing signals. The separated vertical synchronizing signals are coupled from sync separator stage 14 to a vertical deflection generator 15 which develops vertical frequency signals. The output of vertical deflection generator 15 is coupled to the vertical output circuit 16 which provides the required vertical deflection current to a vertical deflection winding 17 associated with a kinescope 13 by means of terminals Y—Y.

Horizontal synchronizing pulses derived from sync separator 14 are applied to a phase detector 18, which is also supplied with a second signal related in time occurrence to the operation of a horizontal oscillator 19 by means of a secondary winding 50*s* on a horizontal output transformer 50. An error voltage is developed in the phase detector 18 and is applied to the horizontal oscillator 19 to synchronize the horizontal oscillator frequency to that of the horizontal synchronizing pulses. The output of horizontal oscillator 19 is coupled by means of a transformer 20 to a horizontal deflection circuit 25.

The operation of the deflection circuit 25 is described in detail in U.S. Pat. No. 3,452,244 assigned to the present assignee. The deflection circuit comprises a bi-directionally conductive trace switching means including a silicon controlled rectifier (SCR) 29 and a parallel coupled damper diode 30. The trace switching means couples a relatively large S-shaping capacitor 37 across deflection winding 31 during the trace portion of each deflection cycle. A first capacitor 28 and a commutating inductor 26 are coupled between the trace switching means and a bi-directionally conductive commutating means which includes a semiconductor device (SCR) 21 and a parallel coupled diode 22. A second capacitor 27 is coupled from the junction of capacitor 28 and inductor 26 to ground. A B+ voltage supply is coupled to a relatively large supply inductor 23 which is further coupled to the junction of commutating inductor 26 and the commutating switching means 21, 22. A switching diode 35 couples a control element 21g of SCR 21 to the S-shaping capacitor 37 as shown in the figure.

An output transformer 50 having a primary winding 50*p* is coupled across the combination of deflection winding 31 and capacitor 37 and includes an arc protection circuit comprising a diode 54, a resistor 55, and a blocking capacitor 56 coupled between the low voltage terminal on the primary winding to ground. A high voltage winding 50*h* provides voltage pulses to a high voltage multiplier 52. Multiplier 52 multiplies the applied voltage to supply at its output, the ultor voltage which is coupled to a terminal 53 on kinescope 13. Having described the circuit, the operation of the invention included therein follows.

As the trace interval of each deflection cycle is initiated, current flowing in yoke 31 is at a maximum value due to prior circuit action involving resonant energy exchanges between inductors 23 and 26, capacitors 27 and 28, the high voltage circuit and deflection winding 31. Current at this time is in a direction illustrated by the arrow accompanying the symbol $I_1$ in FIG. 1. At this time (the beginning of trace), damper diode 30 conducts to complete the yoke current path and current $I_1$ flows in a direction to impress a voltage of a polarity shown in the diagram on capacitor 37. During normal operation, this voltage on capacitor 37 will have a d.c. level of approximately 50 volts.

At the mid-point of trace, which corresponds to the center of the scanned raster, the magnitude of current $I_1$ has decreased to zero and SCR 29 is triggered into conduction by means of a trigger circuit 24 which is supplied by a signal from a winding 23*s* on an input reactor 23. As the second portion of the trace interval begins, capacitor 37 supplies energy to the yoke and the current is in a direction illustrated by the arrow accompanying the symbol $I_2$ (i.e., opposite to the direction of $I_1$). SCR 29 completes the yoke current conduction path. During the latter portion of the trace interval and prior to retrace, a signal from the horizontal oscillator 19 serves to trigger SCR 21 into conduction. This begins a complex series of energy exchanges between the reactive components as explained in detail in U.S. Pat. No. 3,452,244 cited above which serves to interrupt the yoke current path at the end of the trace portion of the deflection cycle by turning off SCR 29. As the yoke current, which is at a maximum value, is interrupted; the magnetic field associated with the yoke current begins to collapse producing a voltage pulse on a conductor 40 which is commonly referred to as the flyback pulse.

This pulse which appears on conductor 40 is positive in the present circuit and occurs during the retrace interval. At the end of retrace, the flyback voltage will start to swing negative. When damper diode 30 is operative, however, the voltage at conductor 40 is prevented from going negative, since diode 30 conducts to clamp the voltage at approximately −.07 volts. If for any reason diode 30 does not conduct, the flyback pulse will be allowed to swing negative, and as stated before, the peak-to-peak input voltage to the high voltage multiplier 52 will be nearly doubled, thereby producing an ultor voltage of an undesirably high level. By adding a switching diode 35 between the gate terminal 21*g* of SCR 21 and the S-shaping capacitor 37, the high voltage will be prevented from rising to an excessive level.

It will be recalled that the S-shaping capacitor 37 has a voltage of approximately +50 volts d.c. across it during normal operation due to the charging current $I_1$. A conduction path for this current will be unavailable if diode 30 becomes non-conductive. Thus, the d.c. voltage on capacitor 37 will diminish to a negative value. As this occurs, switching diode 35 which is normally non-conductive and therefore does not affect the normal circuit operation, now conducts to clamp the gate terminal 21g or SCR 21 to the reduced capacitor 37 voltage. In the present SCR circuit, this prevents the normal commutation cycle which in turn inhibits the generation of the normal flyback pulse rate of 15,734 Hz. This reduces the average voltage on conductor 40 which supplies the high voltage multiplier 52 by means of a high voltage winding 50*h* on transformer 50. In one circuit tested, it was found that the commutating frequency was reduced to approximately 2,000 Hz which was sufficient to hold the high voltage to a value of approximately 20 Kilovolts.

Although the invention is shown in a particular SCR deflection circuit, it is clear that diode 35 may be coupled between a transistor horizontal output device and the S-shaping capacitor to likewise prevent the high voltage from rising when a transistorized deflection circuit is employed in the horizontal output stage.

Another circuit for preventing excessive ultor voltage in the event the damper diode circuit opens, also relies on the fact that the flyback voltage is allowed to swing both positive and negative and is shown in FIG. 2. When this circuit is employed, diode 35 in FIG. 1 can be removed.

In FIG. 2, a peak detector circuit comprising a diode 62 and a capacitor 61 is coupled to winding 50*s* associated with horizontal output transformer 50. The output of this detector is coupled by means of an avalanche diode 60 to a control element of a semiconductor horizontal output device such as gate 21*g* of SCR 21. During normal operation, the pulses appearing across winding 50*s* will be primarily negative and are coupled to the phase detector 18. A small positive component will charge capacitor 61 through diode 62 to a relatively low voltage. When however the damper diode 30 fails, the pulse will have a substantial positive component and rectifier 62 will conduct to place additional charge on capacitor 61 producing an increased voltage of the polarity indicated in the diagram. The avalanche diode 60 value is chosen such that it will conduct in response only to this increased voltage across capacitor 61 and couple a sufficiently positive voltage to the gate 21*g* of SCR 21 to cause it to maintain continuous conduction. It is seen that if SCR 21 conducts, the B+ supply is coupled directly to ground through winding 23*p* of input inductor 23. This continuous current path will draw sufficient current from the B+ supply to cause the protective circuit breaker in the B+ supply (not shown) to open, thereby inactivating the receiver to prevent the development of excessive high voltage.

What is claimed is:

1. A deflection circuit comprising:
a source of deflection frequency signals,
a semiconductor device having a control element coupled to said source of deflection frequency signals,
a deflection winding, a capacitor serially coupled to said deflection winding, the combination coupled across said semiconductor device, a damper diode coupled across said semiconductor device and poled to conduct deflection current during a portion of each deflection cycle, thereby charging said capacitor serially coupled to said deflection winding, a high voltage generation circuit coupled to said damper diode and responsive to peak-to-peak voltages for developing a relatively high output voltage, and switching means coupled to said capacitor and to said control element of said semiconductor device and responsive to changes in the voltage across said capacitor caused by said damper diode conduction path being removed to clamp the voltage at said control element of said semiconductor device to a value to prevent the development of an excessive high voltage from said high voltage generation circuit.

2. A circuit as defined in claim 1 wherein said switching means comprises a diode having an anode terminal coupled to said control element and a cathode terminal coupled to said capacitor.

3. In a deflection circuit including a semiconductor device having a control element for supplying deflection current to a deflection winding wherein an S-shaping capacitor is serially coupled to said deflection winding, and whereby a damper diode provides a conduction path for current in said deflection winding during a portion of each deflection cycle, and wherein a voltage multiplier circuit is employed to produce a high voltage in response to flyback pulses present in said deflection circuit; a high voltage hold down circuit comprises:

a unidirectional conductive device coupled from said S-shaping capacitor to said control element and responsive to a voltage change on said capacitor caused by said damper diode conduction path being removed, to conduct, thereby coupling said control element to said capacitor to prevent the generation of excessive high voltage by said voltage multiplier.

* * * * *